July 8, 1969    G. S. HOLISTER ET AL    3,453,739
STRAIN MEASURING TECHNIQUES
Filed March 27, 1967
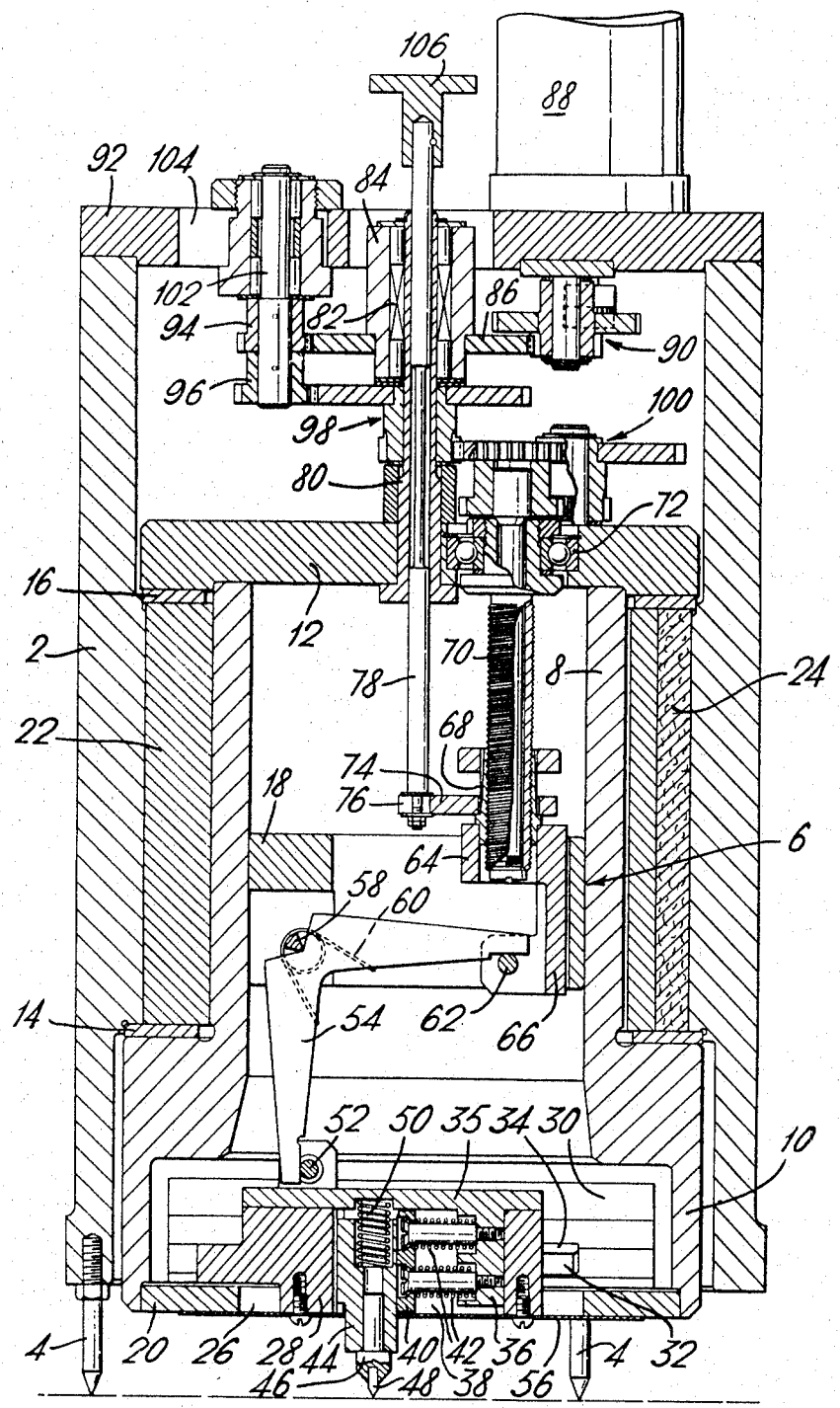

United States Patent Office 3,453,739
Patented July 8, 1969

3,453,739
STRAIN MEASURING TECHNIQUES
Geoffrey Stanley Holister, Anthony Rodger Luxmoore, and Colin Clive Parish, Swansea, Wales, assignors to United Kingdom Atomic Energy Authority, London, England
Filed Mar. 27, 1967, Ser. No. 626,302
Claims priority, application Great Britain, Mar. 28, 1966, 13,554/66
Int. Cl. B43l 9/00
U.S. Cl. 33—27                5 Claims

ABSTRACT OF THE DISCLOSURE

For a replica technique of strain measurement there is provided a scratch cutter device for making on the surface where the measurement is to be taken a scratch pattern composed of a series of closely pitched arcuate scratches. The pattern is preferably an Archimedean spiral with a typical radial scratch density of 1,000 per inch. The device has a rotor carrying a scratching tool in eccentric relationship to the axis of rotation and the eccentricity is variable progressively and steplessly. The eccentricity variation is carried out by drive transmitted from the rotor at constant driving ratio.

---

The present invention relates to the measurement of static strains in engineering materials and is especially applicable to the periodic checking of the strains suffered in service by engineering structures and components. In this application the invention is visualised as an aid in the routine inspection of such objects as pressure vessels.

It has previously been proposed to utilise a technique for strain measurment in a specimen or structure which involves producing surface scratches in two orthogonal directions on the specimen or structure. An initially produced replica of the scratches is later compared with a replica of the scratches after the specimen or structure has been subjected to load. Distortions of the second replica relative to the initial replica are an indication of the strains produced by the loading. A fuller description of such earlier proposals is to be found in a paper by V. M. Hickson, J. Mech. Eng. Sci. 1, No. 2 (1959) page 171.

It is an object of the invention to enable strain measurement by the comparison of replicas to be carried out in any direction instead of simply in the two directions determined by the hitherto employed orthogonal relationship of sets of parallel scratches.

A further object of the invention is to facilitate the comparison and evaluation of replicas and in particular to achieve this by making use of the so-called Moire fringes which are observed when superimposed grids are slightly displaced.

Basically the invention resides in producing on the surface where the strain measurements are to be taken a pattern of closely pitched arcuately extending scratches. For this purpose a scratching tool is rotated over the surface and the radius of rotation is changed, either in steps to produce concentric circular arcs or progressively to produce a continuous spiralling trace. If, as is preferred, a scratching engagement of the tool with the surface is maintained throughout each revolution there will be a series of scratches in any radial direction from the centre of rotation and the scratches of the series will be disposed substantially perpendicular to such radial direction. With a uniform pitch of the arcuately extending scratches, Moire fringes can be formed to assist in evaluation of a replica by superimposed projection of the replica pattern on a master; the master may be either an undistorted form of the pattern, although possibly with a different pitch or simply a series of parallel straight lines.

The invention also resides in a device for producing the scratch pattern. In order to explain more fully the method and advantages of the invention one form of such device, taken merely by way of example, will now be described with reference to the accompanying drawing in which the single figure is a longitudinal cross section.

As seen in the drawing, the scratch device has a cylindrical main housing 2 with tripod legs 4 sharpened to case hardened points. Within the housing is a cylindrical rotor 6 composed of a barrel 8 with an integral enlarged end 10, the step between the barrel and the enlarged end being ground to act as an end bearing surface. An opposite end bearing surface is ground on the overhang of a rotor top plate 12. Bearing engagement pertains between these end bearing surfaces and respective annular thrust washers 14 and 16 fixed internally of the main housing to give endwise location of the rotor, the upper thrust washer 16 being backed up if necessary by a shim to give a close running fit. In order to hold the top rotor plate down on the rotor barrel 8, tie bolts (not shown) connect this plate to a fulcrum support assembly 18 inside the rotor barrel and this assembly is in turn connected, again by tie bolts (not shown) with a rotor base plate 20 seated in a counterbored recess in the open end of the enlarged end 10 of the rotor. Radial location of the rotor is achieved by a micro-clearance bearing bush 22 interposed between the rotor and the main housing; this bush has projections on its outer surface at equal circumferential spacing and these projections are an interference fit in the bore of the housing so that the bush is distorted to form lands at its surface for bearing engagement with the rotor barrel. Oil soaked material 24 is included in the spaces between the outer projections of the bush and from these spaces oil can be fed to the inner surface of the bush through appropriate passages containing wicks. The structure thus far described therefore provides a main housing in which a rotor is freely rotatable but accurately centred by the radial and endwise locations.

The inwardly facing side of the rotor base plate 20 has raised areas to either side of a diametrically extending slot 26 and these areas have finely fiished flat surfaces for the sliding support of a main slide 28. The sliding contact pertains between the raised areas on the base plate and wings projecting to either side of the main slide in a direction perpendicular to the plane of the drawing. In order to locate the slide in this direction, inclined upper surfaces of the wings are in sliding engagement with complementarily inclined guides, one such guide being visible at 30. For the purpose of taking up play in these guides, it is preferred that the inclined surface of one of them is spring-loaded into engagement with the slide. Thus, in the case of the guide 30 it will be seen that the inclined surface 32 is on a pressure bar 34, the latter being protuberant under the action of compression springs (not appearing in the drawing) from a recess in the guide 30.

Fixed on the top of the main slide 28 is a slide top plate 35 having a flange piece 36 projecting into an aperture 38 of the main slide. This flange piece 36 carries a pressure plate 40 loaded by springs 42 and by means of this pressure plate a stylus slide 44 is urged into a V groove formed in the aperture 38, the slide 44 having inclined surfaces complementary to those of the groove. The stylus slide 44 carries a stylus holder 46 with a synthetic sapphire stylus 48 and a compression spring 50 acts on the slide to give the requisite pressure of the stylus on a workpiece.

Ears on the main slide top plate carry a reaction pin 52 abutted by one end of a bell crank lever 54. By movements of this lever the main slide 28, and hence the stylus, is allowed to move radially of the axis of rotation of the rotor. In moving in this manner, the slide 28 carries with it a cover plate 56 for the slot 26 in the rotor base plate. As will be apparent from the drawing, the stylus 48, together with the main slide by which it is carried, is eccentric in relation to the axis of rotation of the rotor. Therefore, by disposing the end of the bell crank lever to the radially outward side of the reaction pin 52, a following engagement of the pin with the lever can be achieved by the centrifugal force set up in the main slide by rotation of the rotor. Optionally, a hair spring may be arranged to maintain this engagement.

The bell crank lever 54 is pivotal about a knife edge fulcrum 58 in the fulcrum support assembly 18. Preferably a hair spring 60 retains the lever correctly positioned on the fulcrum. The opposite end of the lever rests on a reaction pin 62 carried between ears on an adaptor slide 64 having a dovetail 66 by which the adaptor slide is slidably mounted in an undercut groove in the fulcrum support assembly. Fixed to the adaptor slide is a lead screw nut 68 in which can screw freely, but with minimum axial play, a lead screw 70 rotatably mounted by means of a ball bearing 72 in the rotor top plate 12. For fixing the nut in this manner a retainer 74 is bolted down on the adaptor slide. A laterally projecting fork 76 on the retainer actuates a travel indicator rod 78 passing through the interior of a hollow rotor drive spindle 80.

Fixed on the end of the drive spindle 80 projecting out of the rotor is the inner half of a one-way drive clutch 82 (shown diagrammatically). To the outer half is fixed a drive bush 84 on which is fixedly mounted a gear wheel 86. Drive is applied to this gear wheel for rotating the rotor from an electric motor 88 through step-down gearing indicated at 90, the motor being mounted on a top plate 92 of the main housing. Drive for the lead screw 70 is taken from the gear wheel 86 by one of two fixedly coupled pinions 94, 96, the other of these pinions being arranged to transmit to the lead screw through a train of two reduction stages indicated 98, 100. The stage 98 is of course free on the rotor drive spindle 80. The coupled pinions 94, 96 have only a small difference in their respective number of teeth; for example, the difference may be two. In order that the scratches per inch inscribed by the stylus on a workpiece may be varied, a spindle 102 carrying the pinions is adjustable in a radial slot 104 in the top plate 92 of the main housing to enable interchange of different size pairs of pinions having the same size difference.

Additional items which are advantageously added to the top plate of the main housing are a limit switch for cutting out the electric motor supply, accumulators for storing electricity so that the device does not need to depend on external power supplies, and a handle to assist in applying the device firmly to a workpiece when in use. The limit switch should be arranged to be actuated by the travel indicator rod 78 and for this purpose a striker head 106 has been shown on the rod in the drawing.

The one-way clutch 82 is so arranged that forward drive of the motor 88, which causes the rotor to rotate, corresponds to a rotation of the lead screw 70 in a sense causing the main slide 28, and hence the stylus 48, to progress radially outwards. Preparatory to use, the stylus is therefore at the inner limit of its travel although still eccentric relative to the axis of rotation of the rotor. The operator holds the device with pressure against the workpiece and under these conditions the hardened points of the tripod legs are an insurance against shifting while the scratch is being inscribed. Tendencies to shift are minimised by dynamic balancing of the motor. On starting the latter, rotation of the rotor commences and is accompanied, by virtue of the drive to the lead screw 70 and the linkage through the bell crank lever 54, by a radially outward movement of the main slide 28, and hence the stylus. Under the pressure of the compression spring 50 the stylus inscribes a scratch in the workpiece and since the rate of change of stylus radius brought about by movement of the main slide is in constant proportion to the rate of rotation of the rotor the number of scratches per inch is strictly constant in the radial direction of the spiral pattern so formed. Different stylus pressures are obtainable, for example by adjusting the height of the legs 4, and pressure variation influences to work to space ratio by altering the depth of stylus penetration. A mark to space ratio of one half can be regarded as typical for a scratch density of 1,000 per inch.

In the preferred form of the device using a limit switch actuated by the travel indicator rod 78, the motor will be cut out automatically after a spiral of predetermined size has been traced. The drive of the motor is then applied in reverse after removing the device from the workpiece, and by virtue of the one-way clutch the stylus is moved radially inwards without rotation until the starting position is reached. On reaching this position other contacts of the limit switch are actuated to cut out the water once more.

Among the many variants of the device within the scope of the invention, mention may be made of incorporating some means of adherence in the tripod legs. Such means may take the form of limpet magnets. In the case where the workpiece is non-magnetic, suction pads could be used as a substitute.

Once the spiral scratch pattern has been inscribed, a replica can be produced by causing a melted alloy of suitable melting point to impinge on the pattern, the alloy being a film about one tenth of an inch thick on a platen having the same coefficient of thermal expansion as the material of the workpiece in order to compensate for ambient temperature effects. The alloy melting point should lie a little above the temperature prevailing in the workpiece when the replica is being made. When account is taken of the possibility that replicas may need to be taken on hot structures, recourse to a variey of different low melting print alloys may be called for. The aforementioned Hickson paper discloses a bismuth/cadium/tin/lead/indium alloy and variations of the melting point are obtainable by altering the proportion of the bismuth and/or indium. A range of different melting print alloys of this kind are available on the market. Conveniently the taking of a replica is carried out with the aid of a so-called replica gun, this being a hand-held device by which an alloy coated platen is aimed at the scratch pattern to be replicated and which heats the alloy to the requisite plastic state before forcing the platen forward against the pattern. The general principles of such a gun are also to be found in the aforementioned paper.

A replica taken after loading can be evaluated by producing Miore fringes, such fringes being produced by comparison with a master in the form of either an undistorted initial replica or a grid of lines. In order to establish orientation there should be added to the scratch pattern on the workpiece some distinctive eccentrically situated indentation which will be reproduced in the replica. An identation made with a centre punch just outside the spiral is suitable.

Optical evaluation, as by the production of Moire fringes, may be assisted by projecting the replica with transmitted light rather than refleced light. For transmission projection a transparency is required and this is obainable by reproduction of the replica in a transparent medium, such as glass or film. It has been found that acrylic resins will reproduce the replica in a suitable manner by direct casting on the replica. A transparent reproduction lends itself to optical evaluation using various light diffraction orders to improve the sharpness and contrast of Moire fringes.

The formaion of the regular scratch pattern by use of the invention can be done quickly, as is also the case with the production of replicas. The method of the invention is therefore applicable in situations where only a short time is available for access to a specimen or structure, as may be the case for example where the specimen or structure, as may be the case for example where the specimen or structure is subject to hot conditions or radiation hazards.

What we claim is:

1. A scratch cutter device comprising an open-end housing, a rotor located in the housing for rotation about an axis which is stationary relative to the housing, a slide mounted on the rotor for linear relative movement relative thereto, a scratching tool carried on said slide on said rotor and mounted eccentrically relative to said axis and projecting from the open-end of said housing, abutment means on the housing for spacing the housing from a workpiece surface such that the scratching tool is in scratching engagement with the surface, means for rotating said rotor, a bellcrank lever mounted on said rotor for pivotal movement about a pivot which pivotal axis is substantially at right angles to and offset from the first said axis, a reaction member mounted on the slide, one arm of said bellcrank engaging said reacion member such that said relative linear movement of the slide is dependent on movement of the bellcrank about its said pivot axis, and a control means engaging the other arm of the bellcrank for controlling movement of the bellcrank about its said pivot axis.

2. A scratch cutter according to claim 1, wherein said control means include a leadscrew mounted for rotation on said rotor with its axis offset from and parallel to the first said axis, a nut on said leadscrew and engaging one arm of the bellcrank lever, and including a first gear train for driving said leadscrew from said rotor rotating means.

3. A scratch cutter according to claim 2, wherein the means to rotate the rotor comprises a motor carried by the housing and having its output shaft connected to the rotor by a second gear train.

4. A scratch cutter according to claim 2, wherein the first gear train includes a changeable gear section whereby the speed of rotation of the leadscrew relative to the speed of rotation of the means for rotating said rotor can be changed.

5. A scratch cutter according to claim 2, wherein the second gear train includes a one-way clutch adapted to transmit drive from the motor to the rotor only when the motor rotates in one direction.

References Cited

UNITED STATES PATENTS 157,841 12/1874 King.

FOREIGN PATENTS 22,349  5/1883  Germany.
138,332 8/1880  France.
135,183 10/1902 Germany.
198,187 5/1908  Germany.

HARRY N. HAROIAN, *Primary Examiner.*

U.S. Cl. X.R.

73—88